(12) United States Patent
Kruempelmann et al.

(10) Patent No.: US 9,430,219 B2
(45) Date of Patent: Aug. 30, 2016

(54) REVISION SAFE UPGRADE IN A HYBRID CLOUD LANDSCAPE

(71) Applicants: Wulf Kruempelmann, Altlussheim (DE); Joerg Schmidt, Sinsheim (DE)

(72) Inventors: Wulf Kruempelmann, Altlussheim (DE); Joerg Schmidt, Sinsheim (DE)

(73) Assignee: SAP SE, Walldorf (DE)

( * ) Notice: Subject to any disclaimer, the term of this patent is extended or adjusted under 35 U.S.C. 154(b) by 28 days.

(21) Appl. No.: 14/572,257

(22) Filed: Dec. 16, 2014

(65) Prior Publication Data

US 2016/0170734 A1 Jun. 16, 2016

(51) Int. Cl.
*G06F 9/445* (2006.01)
*H04L 29/08* (2006.01)

(52) U.S. Cl.
CPC .............. *G06F 8/65* (2013.01); *H04L 67/06* (2013.01)

(58) Field of Classification Search
CPC ........... G06F 8/65; G06F 8/61; H04L 67/06; H04L 29/08961

USPC ......................................................... 717/172
See application file for complete search history.

(56) References Cited

U.S. PATENT DOCUMENTS

| | | | |
|---|---|---|---|
| 7,584,467 B2 * | 9/2009 | Wickham | G06F 8/65 717/171 |
| 8,621,091 B1 * | 12/2013 | Akalin | G06F 17/30902 709/220 |
| 2002/0065848 A1 * | 5/2002 | Walker | G06F 17/24 715/205 |

* cited by examiner

*Primary Examiner* — Anna Deng
(74) *Attorney, Agent, or Firm* — Fountainhead Law Group PC (57) ABSTRACT

Techniques are described for automatically scheduling and performing upgrades in a hybrid cloud scenario. Advantages to these techniques include revision safe system upgrades and that the process is automated, thus reducing expensive operation costs. Techniques include receiving a landscape model describing changes to a customer landscape, identifying a customer-side system within a customer landscape to upgrade based on the landscape model, and identifying a server-side system within the server landscape that is associated with the customer-side system, and scheduling the customer-side system and the server-side system for upgrade.

15 Claims, 5 Drawing Sheets

REVISION SAFE UPGRADE IN A HYBRID CLOUD LANDSCAPE

BACKGROUND

A hybrid cloud scenario is a modern computer system landscape which includes several computer systems. Some of the computer systems run on the customer side while other computer systems run on the service provider side. The customer side systems are configured to perform a set of functionality that interfaces with the service provider systems which are configured to perform another set of functionality. Together the two sides can perform a task or goal.

When software within a computer system is upgraded, interface dependencies between the system and other systems must be maintained if the hybrid cloud scenario is to perform as expected. As a result, other computer systems must also be upgraded along with the computer system. In one example, upgrading a computer system on the customer side can trigger the upgrade of another computer system on the service provider side. Managing and scheduling the proper time to perform these upgrades can be confusing and require high operation costs.

SUMMARY

In one embodiment, a computer-implemented method receives, by a processor, a landscape model describing changes to a customer landscape, the customer landscape including a plurality of customer-side systems, automatically identifies, by the processor, a customer-side system within the customer landscape to upgrade based on the landscape model, identifies, by the processor, a server-side system within a server landscape that is associated with the customer-side system, and schedules, by the processor, the customer-side system and the server-side system for upgrade.

In one example, the server-side system is configured to communicate with the customer-side system.

In another example, an upgrade of the customer-side system is to an interface for communication between the customer-side system and the server-side system.

In another example, scheduling comprises determining, by the processor, a first time slot which is available to upgrade the customer-side system, determining, by the processor, a second time slot which is available to upgrade the server-side system, determining, by the processor, a period of time that overlaps between the first time slot and the second time slot; and scheduling the upgrade of the customer-side system and the server-side system during the period of time. In one example, determining the first time slot comprises executing, by the processor, a predefined boundary condition that specifies a period of downtime for the customer-side system and identifying, by the processor, the first time slot based on the execution. In another example, determining the second time slot comprises executing, by the processor, a predefined boundary condition that specifies an active period of the server-side system and identifying, by the processor, the second time slot based on the execution.

In another example, the method further comprises synchronizing a clock of the customer-side system and the server side system.

In another embodiment, a non-transitory computer readable storage medium stores one or more programs comprising instructions for receiving a landscape model describing changes to a customer landscape, the customer landscape including a plurality of customer-side systems, automatically identifying a customer-side system within the customer landscape to upgrade based on the landscape model, identifying a server-side system within a server landscape that is associated with the customer-side system, and scheduling the customer-side system and the server-side system for upgrade.

In another embodiment, a computer implemented system comprises one or more computer processors and a non-transitory computer-readable storage medium. The non-transitory computer-readable storage medium comprises instructions, that when executed, control the one or more computer processors to be configured for receiving a landscape model describing changes to a customer landscape, the customer landscape including a plurality of customer-side systems, automatically identifying a customer-side system within the customer landscape to upgrade based on the landscape model, identifying a server-side system within a server landscape that is associated with the customer-side system, and scheduling the customer-side system and the server-side system for upgrade.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are techniques for automatically scheduling and performing upgrades in a hybrid cloud scenario. Advantages to these techniques include revision safe system upgrades and that the process is automated, thus reducing expensive operation costs.

Figure 1:
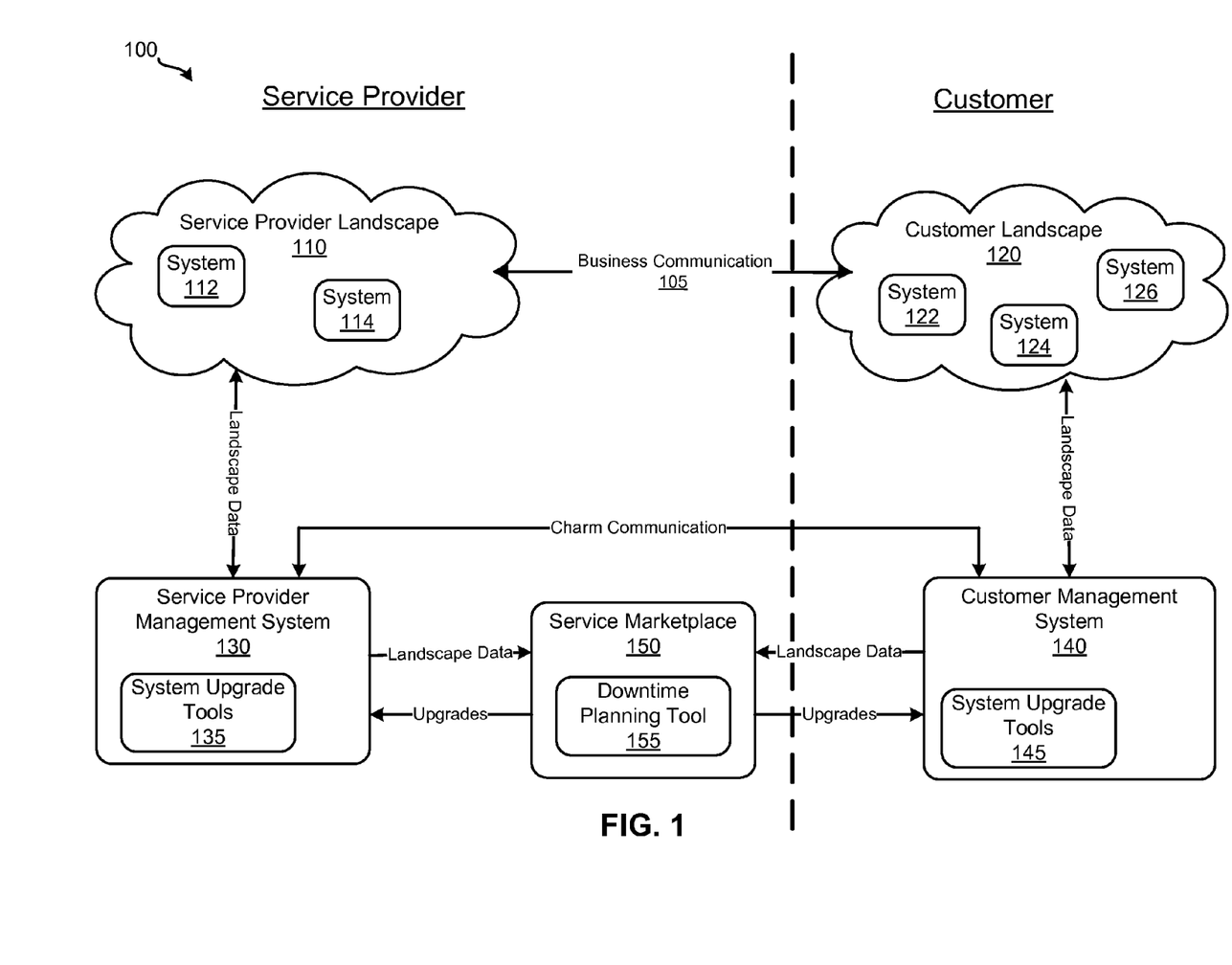
FIG. 1 illustrates hybrid cloud scenario for upgrading systems on the service provider side and on the customer side according to one embodiment.

FIG. 1 illustrates hybrid cloud scenario for upgrading systems on the service provider side and on the customer side according to one embodiment. Scenario 100 includes service provider landscape 110 which includes systems 112 and 114. Service provider landscape 110 is configured to host a variety of computer systems on the service provider side. Each computer system can be configured to perform functions on the service provider side. Exemplary functions can include business functions such transferring funds within bank accounts or updating employee information. Scenario 100 further includes customer landscape 120 which includes systems 122, 124, and 126. Similar to customer landscape 110, customer landscape 120 is configured to host a variety of computer systems on the customer side. Each computer system can be configured to perform functions on the customer side. These functions can include a human resource system, a docketing system, a payroll system, and a benefits system. Computer systems within customer landscape 120 can communicate with computer systems within service provider landscape 110 through a business communication channel 105. In one example, a payroll system within customer landscape 120 can communicate monthly payroll data to a financial system within the service provider. The financial system can transfer funds between bank accounts according to instructions provided by the payroll system. Since the systems in both landscapes communicate with one another, it is important that the different interfaces use to communicate within each system is shared, thus allowing systems to interoperate with one another. Each system within both landscapes can include landscape data that describes the configuration of systems within the landscape. For example, landscape data can describe a system by providing details on the system, a proxy associated with the system, or the software release version of the system. In one embodiment, the service provider side and the customer side can include multiple landscapes. For example, the service provider side can include a development, quality assurance, and production landscape. Each landscape can be sandboxed, which means that changes in one do not affect the other landscapes.

System 100 further includes service provider management system 130. Service provider management system 130 is configured to manage the state of each system within service provider landscape 110. Service provider management system 130 can process landscape data received from service provider landscape 110. Service provider management system 130 further includes system upgrade tools 135. System upgrade tools 135 can include tools configured to upgrade computer systems within service provider landscape 110. In on embodiment, system planning tools 135 can recognize the changes to systems within customer landscape 120 due to an upgrade on the customer side. System upgrade tools 135 can adopt to the changes within customer systems to ensure that systems within service provider landscape 120 can properly interface with the upgraded systems within customer landscape 120.

System 100 further includes customer management system 140. Customer management system 140 is configured to manage the state of each system within customer landscape 120. Customer management system 130 can process landscape data received from customer landscape 120. Customer management system 130 further includes system upgrade tools 135. System upgrade tools 145 can include tools configured to upgrade computer systems within customer landscape 120. In on embodiment, system planning tools 145 can recognize the changes to systems within service provider landscape 110 due to an upgrade on the server side. In one embodiment, system upgrade tools 145 can notify the customer of changes that need to be made in order for customer landscape 120 to properly interface with service provider landscape 110. In another embodiment, system upgrade tools 145 can automatically update software code for systems in customer landscape 120 to ensure that the systems can properly interface with service provider landscape 110.

System 100 further includes service marketplace 150. Service marketplace 150 is a system on the service provider side that is configured to automate upgrades of systems in service provider landscape 110 and customer landscape 120. The customer can communicate with service marketplace 150 for the processing of system upgrades on service provider landscape 110 or customer landscape 120. In one embodiment, service marketplace 150 can be utilized to model customer landscape 120. Landscape modeling is the process of evaluating and upgrading one or more systems that make up customer landscape 120. In another embodiment, service marketplace 150 can be utilized to schedule system upgrades. For example, service marketplace 150 can identify time slots to upgrade systems on service provider landscape 110 and time slots to upgrade systems on customer landscape 120. Service marketplace 150 can also group systems so that they are upgraded at substantially the same time. Service marketplace 150 includes downtime planning tool 155 which is configured to identify time slots which are available for a system upgrade and to schedule the system upgrades. Service marketplace 150 can receive landscape data from service provider management system 130. The landscape data can be analyzed to identify systems within customer landscape 120 that are to be updated and to identify time slots that would be convenient to upgrade systems within service provider landscape 110.

Figure 2:
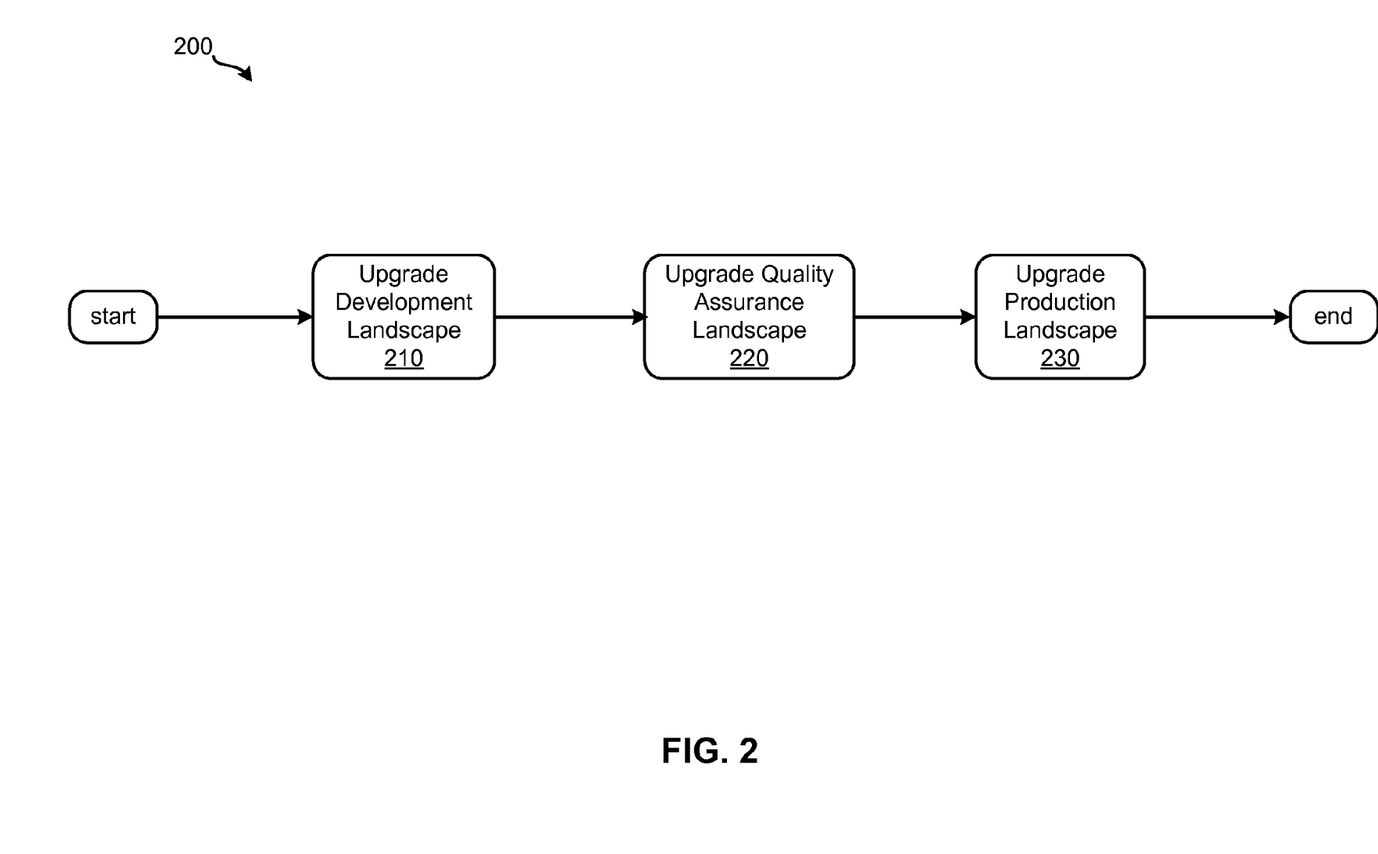
FIG. 2 illustrates a process flow for upgrading multiple landscapes according to one embodiment.

FIG. 2 illustrates a process flow for upgrading multiple landscapes according to one embodiment. Some hybrid cloud scenarios can be configured to include multiple landscapes so that different groups within the organization can be sandboxed within a landscape. As shown, process 200 begins at step 210 by upgrading the development landscape. Upgrading the development landscape can include modeling the development landscape, planning upgrades in the development landscape, scheduling when the upgrades shall be performed, and performing the upgrades. Once the development landscape has been upgrades, process 200 can continue to step 220 by upgrading the quality assurance landscape. Upgrading the quality assurance landscape can include the same or similar techniques applied when upgrading the development landscape. Once the quality assurance landscape has been upgraded, process 200 can continue to step 230 by upgrading the production landscape. Upgrading the production landscape can include the same or similar techniques applied when upgrading the development landscape. Once all three landscapes have been upgraded, process 200 ends.

In some embodiments, upgrading the systems in a landscape can include two processes; a preparation process where the systems to upgrade are identified and the upgrades are schedules and an execution process where the scheduled system upgrades are executed.

Figure 3:
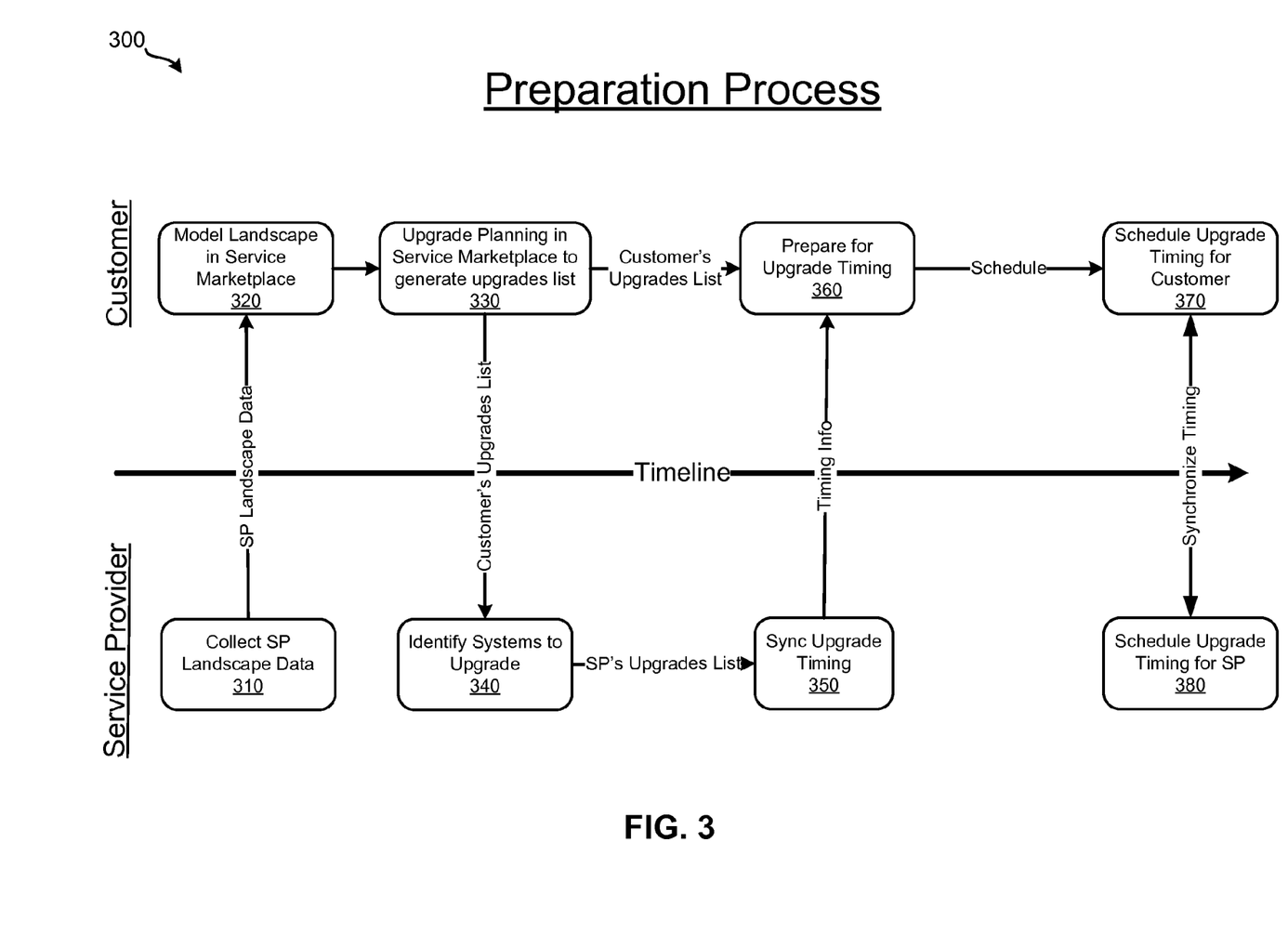
FIG. 3 illustrates a preparation process according to one embodiment.

FIG. 3 illustrates a preparation process according to one embodiment. As shown, process/s 300 includes steps which are performed on the customer side and steps which are performed on the service provider side. Process 300 can begin with the service provider collecting landscape data at step 310. In one embodiment, the service provider management system 130 can collect landscape data from systems within service provider landscape 110. For example, service provider management system can periodically query systems within service provider landscape 110 for landscape data associated with those systems. Service marketplace 150 can query service provider management system 130 for the landscape data or a reduced version of the landscape data. The reduced version can contain metadata that is used when upgrading systems. Other metadata that is associated with managing the systems rather than the system upgrades can remain within service provider management system 130.

Process 300 continues with the customer utilizing the service marketplace 150 to model customer landscape 120 at 320. In one embodiment, the customer can utilize an application within service marketplace 150 to model customer landscape 120. Modeling can include evaluating the systems within customer landscape 120. A customer can model customer landscape 120 based on the customer's specific needs.

Once modeling has been completed on customer landscape 120, process 300 can continue with upgrade planning at step 330. Upgrade planning can be performed within the service marketplace. In one embodiment, the customer can specify the systems to upgrade during the upgrade planning step. In another embodiment, service marketplace 330 can automatically identify customer side systems to upgrade based on the landscape model. For example, systems that have changed in the model landscape (and thus require an upgrade) and systems that depend on the changed systems can be included in the upgrades list. In one example, the upgrades list can be a stack XML file. In one embodiment, service marketplace 150 can automatically determine which systems are to be upgraded based on the landscape planning.

Once the customer's upgrades list has been determined, process 300 can continue by identifying systems on the service provider landscape 110 that are to be upgraded. In one embodiment, service marketplace 150 can automatically generate a service provider's upgrades list based on the customer's upgrades list. For example, systems within service provider landscape 110 that are in communication with systems in the customer's upgrades list may need to be upgraded to ensure that the interface between systems on service provider landscape 110 and customer landscape 120 can properly communicate with one another.

Once the upgrades list for both landscapes (service provider and customer) are generated, process 300 can continue by syncing upgrade timing at step 350. In one example, service marketplace 150 can group systems to be upgraded. The systems to be upgraded can be grouped base on correlation of modules within the systems which are to be upgraded. In some embodiments, service marketplace 150 (or alternatively service provider management system 130) can evaluate the systems to be upgraded and identify time slots which are available to perform the upgrades. For example, each system can have different business hours of operation. As such, each system can be upgraded during certain times during the day. In one example, a system can only be upgraded during non-business hours. In another example, the system can only be upgraded during business hours. As a result, the timing information can be generated to specify time slots in which the server-side systems can be upgraded.

Once the timing information has been generated for upgrade systems on service provider landscape 110, process 300 can continue by preparing for the upgrade timing of upgrade systems on the customer side at 360. Service marketplace 150 can receive customer's upgrades list and service provider's timing information. The timing information can include a selection of time slots that are available for performing each scheduled upgrade on service provider systems while the customer's upgrades list can include a list of customer systems that are scheduled for an upgrade. For each customer system to be upgraded, service marketplace 150 can first determine a first list of time slots which are available for upgrading the customer system. The first list can contain time slots which the customer system is offline or non-business hours, thus allowing the upgrade to be performed during downtime of the customer system. The time slots for the first list can be determined from metadata on the customer system. In some embodiments, service marketplace 150 can also determine a second list of one or more time slots for a service provider system is to be upgraded at substantially the same time as the customer system. The second list can be from the timing information of the service provider. Service marketplace 150 can prepare the upgrade timing of the customer system by correlating time slots within the first list with time slots within the second list. The correlated time slots are time slots in which the customer system and the corresponding service provider system which communicated with the customer system can be upgraded. The correlated time slots can be presented to the customer, who in turn selects one of the correlated time slots. Alternatively, service marketplace 150 can automatically select the earliest time slot which is available. Once the upgrade of the customer system has been selected, process 300 can continue by scheduling the upgrade timing for the customer at 370 and scheduling the upgrade timing for the service provider at 380. Scheduling the upgrade timing can include communicating with the customer management system 140 and service provider management system 130 to schedule when the system upgrades will take place.

In one embodiment, service marketplace 150 can determine the first list of time slots according to predefined boundary conditions from the customer side. The predefined boundary conditions can provide rules which define when an upgrade can be performed on the customer side. A boundary condition can specify that an upgrade should occur during non-productive times within the customer's organization. Non-productive times can be periods of customer downtime. For example, the customer's organization may experience downtime during the holidays, weekends, and evenings. Downtime can be a period of time in which users within the customer's organization are not utilizing the customer system, thus making the period of time ideal for upgrading the customer system.

In another embodiment, service marketplace 150 can determine the second list of time slots according to other predefined boundary conditions from the service provider side. The predefined boundary conditions can provide rules which define when an upgrade can be performed on the service provider side. In one example, the boundary condition can specify that the upgrade should be performed during the service provider's business hours of operation. In some examples, the multiple upgrades can be clustered to reduce support efforts. Clustered system upgrades can be evaluated together to determine time slots which would satisfy the boundary conditions for each of the clustered systems. In another example, upgrades between different customers can be grouped. For instance, customers who share a similar infrastructure can be grouped together so that upgrades can be performed for similar customers at the same time.

Figure 4:
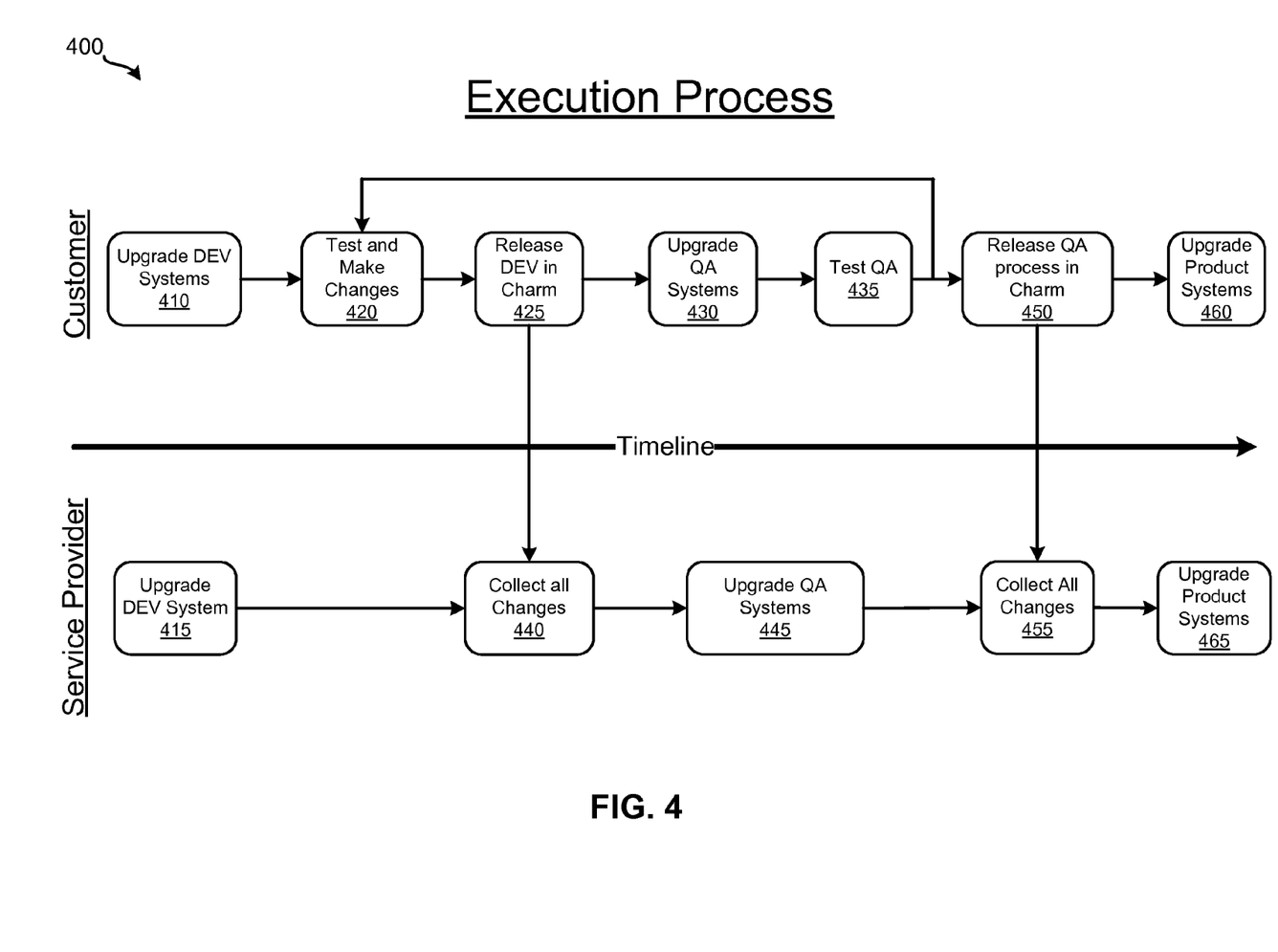
FIG. 4 illustrates an execution process according to one embodiment.

FIG. 4 illustrates an execution process according to one embodiment. Process 400 can be performed after execution of the preparation process described in FIG. 3. At the scheduled downtime for the customer and service provider system, the customer system and the service provider system can be upgraded at substantially the same time. Service provider management system 130 can perform the actions related to the service provider while customer management system 140 can perform the actions related to the customer. In some embodiments, service provider management system 130 and customer management system 140 can automatically begin upgrading the systems within their respective landscapes at the scheduled time.

Process 400 begins by upgrading the development systems at step 410. During the upgrade, customer management system 140 can recognize changes made by the customer to the software provided by the service provider. For example, the customer can modify the software to add in additional functionality or features. At step 420, customer management system 140 can test and make changes to the development system. For example, the additional functionality or features can be tested to ensure that they are compatible with the service provider systems. If upgrades made by the customer do not conform to certain predefined rules (such as defined interfaces between the customer and the service provider), the customer management system 140 can request the customer to fix these changes and adopt the new delivered software.

At substantially the same time as the customer is upgrading the development systems, the service provider can also upgrade its corresponding development systems at step 415. During the upgrade, service provider management system 130 can recognize changes made by the customer to the software provided by the service provider and modify the software on the service provider.

Once the customer has tested and made changes to the development system, the customer can release the changes to the development system in charm. Charm is a communication channel between service provider management system 130 and customer management system 140. Both management systems can utilize the charm communication channel to communicate changes to computer systems. Here, customer management system 140 can transmit development system changes to service provider management system 140, which collects the changes at step 440. Based on the changes received from the customer, service provider management system can in turn upgrade the QA systems at step 445.

After releasing the development changes, customer management system 130 can upgrade the QA systems at 430. Upgrading the QA system can include upgrading test suits and test cases according to the development changes. At 435, customer management system 140 can test the QA system. If testing is unsuccessful, then the process can be repeated where the development system is tested and changes are made. This iterative process can continue until QA testing is successful. In one embodiment, the development changes can be released in each iteration to the service provide so that the service provider management system 130 can piecemeal upgrade the QA systems. This can result in improved turnaround time.

Once all the QA system has been successfully tested, customer management system 130 can release the QA changes in charm at 450. The QA changes can be collected by service provider management system 130 at 455. Lastly, customer management system 140 can upgrade product systems at 460 and service provider management system 130 can upgrade product systems at 465.

Figure 5:
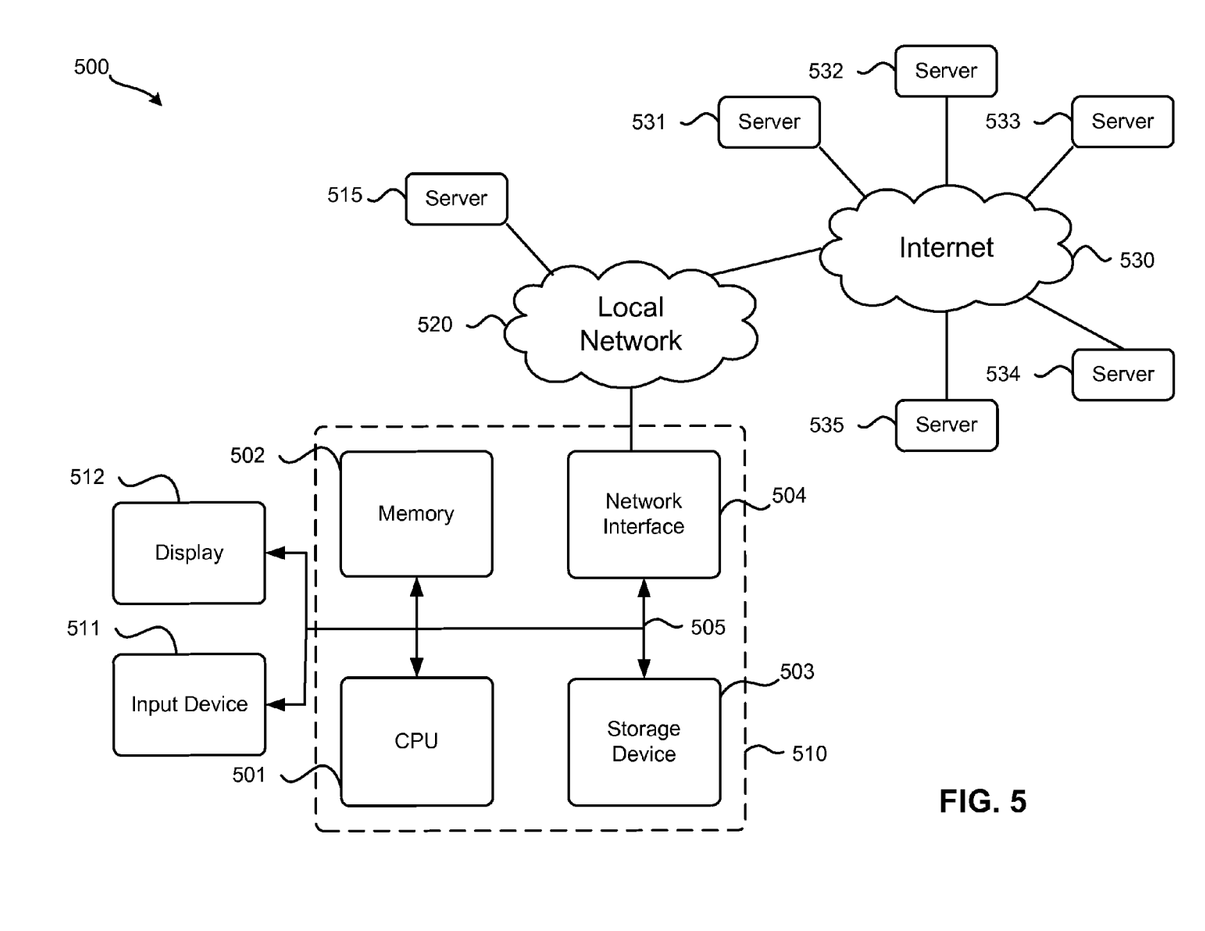
FIG. 5 illustrates an exemplary computer system according to one embodiment.

An exemplary computer system 500 is illustrated in FIG. 5. Computer system 510 includes a bus 505 or other communication mechanism for communicating information, and a processor 501 coupled with bus 505 for processing information. Computer system 510 also includes memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   in a hybrid cloud system comprising a customer landscape configured to host a plurality of customer-side computer systems and a service provider landscape configured to host a plurality of service provider-side computer systems, wherein the plurality of customer-side computer systems and service provider-side computer systems are in communication with a service marketplace server computer via one or more interfaces;

receiving, by a processor of the service marketplace server computer, a customer landscape model describing changes to one or more of the customer-side computer systems of the customer landscape;

identifying, by the processor of the service marketplace server computer, at least one customer-side computer system within the customer landscape to upgrade based on the customer landscape model;

identifying, by the processor, at least one service provider-side computer system within the service provider landscape that is associated with the customer-side computer system to be upgraded; and scheduling, by the processor, the at least one customer-side computer system and the at least one service provider-side computer system for upgrade at substantially the same time to maintain interface dependencies between the customer-side computer systems of the customer landscape and the service provider-side computer systems of the service provider landscape, wherein the scheduling comprises:

determining, by the processor of the service marketplace server computer, a first time slot which is available to upgrade the customer-side computer system, determining, by the processor, a second time slot which is available to upgrade the service provider-side computer system, determining, by the processor, a period of time that overlaps between the first time slot and the second time slot, scheduling the upgrade of the at least one customer-side computer system and the at least one service provider-side computer system during the period of time, and synchronizing a clock of the at least one customer-side computer system and the at least one service provider-side computer system.

2. The computer-implemented method of claim 1, wherein the interface dependencies between the customer-side computer systems and the service provider-side computer systems are maintained by the service marketplace server computer during upgrades to the hybrid cloud system.

3. The computer-implemented method of claim 1, wherein an upgrade of the customer-side computer system is applied to the one or more interfaces for communication between the at least one customer-side computer system and the at least one service provider-side computer system.

4. The computer-implemented method of claim 1, wherein determining the first time slot comprises:

executing, by the processor, a predefined boundary condition that specifies a period of downtime for the at least one customer-side computer system; and identifying, by the processor, the first time slot based on the execution.

5. The computer-implemented method of claim 1, wherein determining the second time slot comprises:

executing, by the processor, a predefined boundary condition that specifies an active period of the at least one service provider-side computer system; and identifying, by the processor, the second time slot based on the execution.

6. A non-transitory computer readable storage medium storing one or more computer programs, the one or more computer programs comprising instructions for performing operations comprising:

in a hybrid cloud system comprising a customer landscape configured to host a plurality of customer-side computer systems and a service provider landscape configured to host a plurality of service provider-side computer systems, wherein the plurality of customer-side computer systems and service provider-side computer systems are in communication with a service marketplace server computer via one or more interfaces;

receiving, by a processor of the service marketplace server computer, a customer landscape model describing changes to one or more of the customer-side computer systems of the customer landscape;

identifying, by the processor of the service marketplace server computer, at least one customer-side computer system within the customer landscape to upgrade based on the customer landscape model;

identifying, by the processor, at least one service provider-side computer system within the service provider landscape that is associated with the customer-side computer system to be upgraded; and scheduling, by the processor, the at least one customer-side computer system and the at least one service provider-side computer system for upgrade at substantially the same time to maintain interface dependencies between the customer-side computer systems of the customer landscape and the service provider-side computer systems of the service provider landscape, wherein the scheduling comprises:

determining, by the processor of the service marketplace server computer, a first time slot which is available to upgrade the customer-side computer system, determining, by the processor, a second time slot which is available to upgrade the service provider-side computer system, determining, by the processor, a period of time that overlaps between the first time slot and the second time slot, scheduling the upgrade of the at least one customer-side computer system and the at least one service provider-side computer system during the period of time, and synchronizing a clock of the at least one customer-side computer system and the at least one service provider-side computer system.

7. The non-transitory computer readable storage medium of claim 6, wherein the interface dependencies between the customer-side computer systems and the service provider-side computer systems are maintained by the service marketplace during upgrades to the hybrid cloud system.

8. The non-transitory computer readable storage medium of claim 6, wherein an upgrade of the customer-side computer system is applied to the one or more interfaces for communication between the at least one customer-side computer system and the at least one service provider-side computer system.

9. The non-transitory computer readable storage medium of claim 6, wherein determining the first time slot comprises:

executing, by the processor, a predefined boundary condition that specifies a period of downtime for the at least one customer-side computer system; and identifying, by the processor, the first time slot based on the execution.

10. The non-transitory computer readable storage medium of claim 6, wherein determining the second time slot comprises:

executing, by the processor, a predefined boundary condition that specifies an active period of the at least one service provider-side computer system; and identifying, by the processor, the second time slot based on the execution.

11. A computer implemented system, comprising:

one or more computer processors; and a non-transitory computer-readable storage medium comprising instructions, that when executed, control the one or more computer processors to be configured for performing operations in a hybrid cloud system comprising a customer landscape configured to host a plurality of customer-side computer systems and a service provider landscape configured to host a plurality of service provider-side computer systems, wherein the plurality of customer-side computer systems and service provider-side computer systems are in communication with a service marketplace server computer via one or more interfaces, the operations comprising:

receiving, by a processor of the service marketplace server computer, a customer landscape model describing changes to one or more of the customer-side computer systems of the customer landscape;

identifying, by the processor of the service marketplace server computer, at least one customer-side computer system within the customer landscape to upgrade based on the customer landscape model;

identifying, by the processor, at least one service provider-side computer system within the service provider landscape that is associated with the customer-side computer system to be upgraded; and scheduling, by the processor, the at least one customer-side computer system and the at least one service provider-side computer system for upgrade at substantially the same time to maintain interface dependencies between the customer-side computer systems of the customer landscape and the service provider-side computer systems of the service provider landscape, wherein the scheduling comprises:

determining, by the processor of the service marketplace computer server, a first time slot which is available to upgrade the customer-side computer system, determining, by the processor, a second time slot which is available to upgrade the service provider-side computer system, determining, by the processor, a period of time that overlaps between the first time slot and the second time slot, scheduling the upgrade of the at least one customer-side computer system and the at least one service provider-side computer system during the period of time, and synchronizing a clock of the at least one customer-side computer system and the at least one service provider-side computer system.

12. The computer implemented system of claim 11, wherein the service provider landscape or the customer landscape comprises multiple landscapes.

13. The computer implemented system of claim 11, wherein an upgrade of the customer-side computer system is applied to the one or more interfaces for communication between the at least one customer-side computer system and the at least one service provider-side computer system.

14. The computer implemented system of claim 11, wherein determining the first time slot comprises:

executing, by the processor, a predefined boundary condition that specifies a period of downtime for the at least one customer-side computer system; and identifying, by the processor, the first time slot based on the execution.

15. The computer implemented system of claim 11, wherein determining the second time slot comprises:

executing, by the processor, a predefined boundary condition that specifies an active period of the at least one service provider-side computer system; and identifying, by the processor, the second time slot based on the execution.

\* \* \* \* \*